United States Patent [19]

Petzold et al.

[11] Patent Number: 5,056,639
[45] Date of Patent: Oct. 15, 1991

[54] DEVICE AND METHOD FOR THE CONTROL OF AN AUTOMATIC VEHICLE CLUTCH

[75] Inventors: Rainer Petzold, Friedrichshafen; Norbert Wiencek, Hagnau, both of Fed. Rep. of Germany

[73] Assignee: Zahnradfabrik Friedrichshafen AG, Friedrichshafen, Fed. Rep. of Germany

[21] Appl. No.: 581,396

[22] Filed: Sep. 10, 1990

[51] Int. Cl.$^5$ ............................................. B60K 41/02
[52] U.S. Cl. ................................ 192/0.076; 192/0.096
[58] Field of Search ........................... 192/0.076, 0.096

[56] References Cited

U.S. PATENT DOCUMENTS

| | | | |
|---|---|---|---|
| Re. 30,189 | 1/1980 | Perr | 123/446 |
| 4,250,857 | 2/1981 | Taplin | 123/496 |
| 4,295,551 | 10/1981 | Zimmermann et al. | 192/0.076 |
| 4,396,151 | 8/1983 | Kato | 239/91 |
| 4,402,456 | 9/1983 | Schneider | 239/91 |
| 4,457,411 | 7/1984 | Hiramatsu | 192/0.076 |
| 4,463,725 | 8/1984 | Laufer | 239/88 |
| 4,471,740 | 9/1984 | Jourde | 123/446 |
| 4,471,940 | 9/1984 | Jourde | 239/90 |
| 4,593,664 | 6/1986 | Omori | 123/446 |
| 4,632,231 | 12/1986 | Hattori et al. | 192/0.076 |
| 4,646,891 | 3/1987 | Braun | 192/0.076 X |
| 4,651,855 | 3/1987 | Grunberg | 192/0.076 X |
| 4,699,320 | 10/1987 | Sisson | 239/91 |
| 4,713,764 | 12/1987 | Klatt | 192/0.076 X |
| 4,714,145 | 12/1987 | Kurihara et al. | 192/0.076 X |
| 4,858,131 | 8/1989 | Sugimura et al. | 192/0.076 X |
| 4,951,631 | 8/1990 | Eckert | 239/88 |

FOREIGN PATENT DOCUMENTS

| | | |
|---|---|---|
| 0130792 | 1/1985 | European Pat. Off. . |
| 3447676 | 8/1985 | Fed. Rep. of Germany . |
| 2387137 | 12/1978 | France ............................ 192/0.076 |
| 191635 | 11/1983 | Japan . |
| 146923 | 8/1985 | Japan . |
| 1427039 | 3/1976 | United Kingdom ............ 192/0.076 |
| 2140099 | 11/1984 | United Kingdom .............. 123/446 |
| 2173273 | 9/1985 | United Kingdom . |
| 2165914 | 4/1986 | United Kingdom . |

Primary Examiner—Rodney H. Bonck
Attorney, Agent, or Firm—Herbert Dubno; Andrew Wilford

[57] ABSTRACT

A device for the control of an automatic motor vehicle clutch is arrayed between an engine and a geaar box and acts primarily as a start-up clutch. A control device receives an electric signal coming from an electronic control device and transforms it into a control quantity for an actuator which engages and disengages the clutch. The engagement of the clutch at start-up occurs with a basic clutch-in speed dependent upon the positioning of the gas pedal and initiated by this positioning and is determined as an electric signal by an electronic control device. For this purpose, a characteristic curve which was determined specifically for the engine is stored in the memory of the electronic control device so that in dependence on the displacement angle of the gas pedal the basic clutch-in speed can be determined very quickly and in a simple manner. It is possible to further improve the quality of the clutch-in process by means of correction factors which are multipliers for the basic clutch-in speed. The highest requirements of a clutch are satisfied when, shortly before reaching the point of synchronization, the clutch is displaced once more in direction of disengagement, whereby the moment of disengagement as well as the disengagement speed are likewise determined by characteristic curves.

11 Claims, 2 Drawing Sheets

DEVICE AND METHOD FOR THE CONTROL OF AN AUTOMATIC VEHICLE CLUTCH

This is a continuation of co-pending application Ser. No. 07/329,158 filed on 22 Feb. 1989 and now abandoned.

CROSS REFERENCE TO RELATED APPLICATIONS

This application is a national phase application of PCT/EP87/00525 filed 19 Mar. 1987 and based upon a Luxembourg application PCT/EP86/00544 filed 19 Sept. 1986 under the International Convention.

FIELD OF THE INVENTION

Our present invention relates to a device for the control of an automatic clutch for motor vehicles.

BACKGROUND OF THE INVENTION

From the introduction to the description in German patent document 34 47 676, devices for the automatic control of a clutch are known in which the clutch is arrayed between an engine of a motor vehicle and a transmission, preferably to be shifted automatically.

The engagement and the speed of engagement is, as described, influenced by the speed increase of the engine and the instantaneous engine speed.

It is further known to utilize the amount of change of the engine speed due to the actuating speed of the gas pedal to control the engagement speed of the clutch.

Further, it is known from German patent document DE-OS 34 74 676 to store a maximum acceleration of the engine speed electronically for the determination of a clutch engagement speed and to compare it with an actually measured engine speed during acceleration, and to cause clutch disengagement or to leave the clutch disengaged at an equal or lower engine speed, or to cause clutch engagement when the actual engine speed is higher.

Since the procedure described occurs during relatively short periods, a smooth yet efficient start of a vehicle is assured. Furthermore, the life of the automatic clutch is extended, and the performance of the vehicle is improved, in that acceleration of the engine at idle is avoided. The slip of the partially engaged clutch is minimized. Finally, a rapid start of the vehicle is facilitated without overloading the engine. This arrangement may be quite suitable for application to a passenger car, but is not applicable to a utility vehicle such as a truck, because the response time of the described control is too slow. With the large diesel engines in utility vehicles, this slow response can lead to excessive engine speed or an excessive increase in torque. The rapid torque fluctuations arising upon clutch engagement give rise to unacceptable vibration in the sensitive drive trains of utility vehicles.

OBJECT OF THE INVENTION

It is therefore the object of the invention to provide a device for the automatic engagement of a clutch of the type described, which is also applicable to utility vehicles, and offers the advantages described to the fullest extent.

SUMMARY OF THE INVENTION

This object is achieved according to the invention with a control system whereby, upon start-up, the clutch-in of clutch occurs with a clutch-in speed ($V_{KG}$) depending on a characteristic engine quantity or parameter, e.g. the position of gas pedal, the clutch-in speed $K_{KG}$ being adapted to the various resistances to acceleration via correction during the entire clutch-in process.

While in the automatic clutch control devices heretofore known, the clutching-in process starts only when an increase in engine speed is already sensed by the electronic control device, the clutching-in according to the present invention can start immediately upon actuation of the gas pedal. Thus, the fastest possible torque increase is assured. Delays in response, which arise between the actuation of the gas pedal and the effect of the electronic acceleration of the throttle or the fuel injector or in the engine itself are avoided.

With the cancellation and activation of a basic clutch-in speed depending, for example on the position of the gas pedal, a basic clutch-in speed for the actuation of the clutch becomes effective which is not only fast but also is adapted to the resistance to acceleration and is thus of good quality.

Likewise, the power demand of the driver, which is expressed as degree of pedal depression, acts upon the magnitude of the basic clutch-in speed of the clutch. Therefore, it is not necessary to hold back in demands on the engine because of a sluggish clutch action.

The basic clutch-in speed which is a function of the demand on the engine is effective only in the initial phase of the clutching-in process. In subsequent phases, however, it remains a control valve for the clutch-in speed, which by means of corrections can be adapted even better to the varying resistances to acceleration, and as a function of the qualitative requirements of the vehicle acceleration.

If this basic clutch-in speed which depends on the gas pedal position, is incorporated into the electronic control device as a control curve, and is sensed by the gas pedal with sufficiently large subdivisions or increments of the actuating path even in sufficiently small intervals, then the time delay which would be required for complicated calculations by the electronic control device would be eliminated.

If this control curve is established specifically adapted to the engine, then the engagement process of the clutch occurs not only quickly, but the clutching-in process is also of high quality.

In order to satisfy all possible operating conditions, it is necessary to adapt, in a second phase of the clutching-in process, the effective basic clutching-in speed to the various resistances to acceleration, even better, even in extreme startup conditions, via a correction factor which is derived from the change in speed differences. This correction factor is thereby multiplied by the basic clutch-in speed, and fashioned in a simple manner so that it is effective only when the motor output speed and the gear box input speed change with respect to one another in an undesirable ratio.

With a further modifying mechanism in form of a correction factor in the third phase of the clutching-in process, the gradient of the motor speed, after attainment of the maximum motor speed, can, via retardation or acceleration be brought to a value favorable to the engagement process. The multiplication of the engagement speed with this correction factor, which is the same as the first correction factor, contained in a control curve in the electronic control device, is readily available and results in a simple control operation, because complicated calculations are not required. A particularly good the clutching-in operation is possible when just before attainment of synchronous speed, the clutch is once more briefly urged towards disengagement. Thereby a jolt-free engagement of the clutch is possible even in the most extreme situations.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
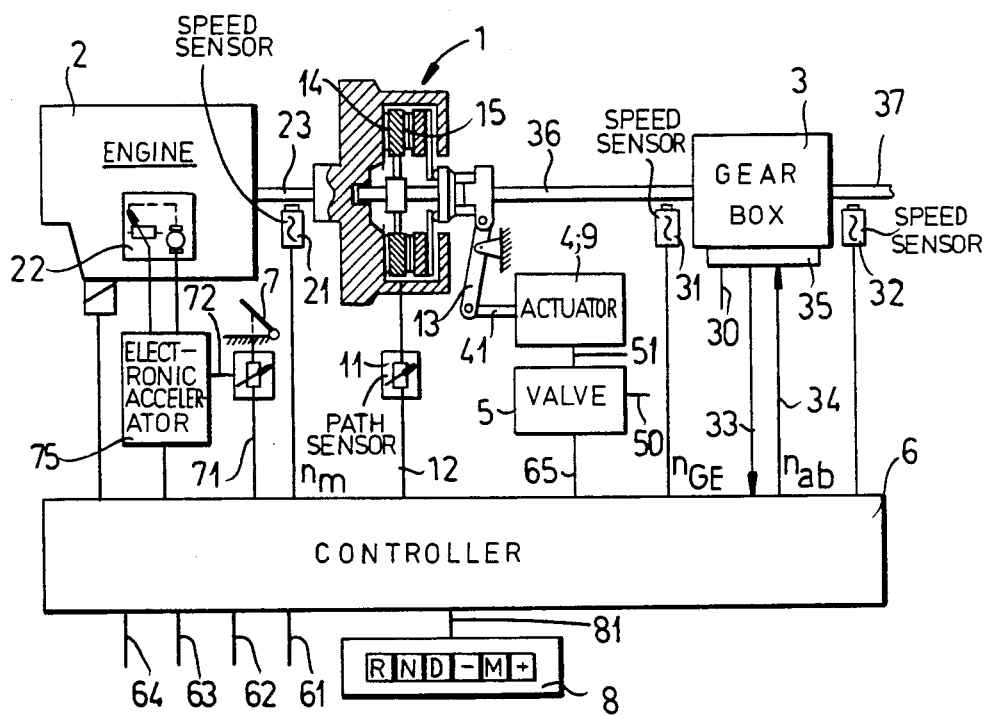
FIG. 1 is a block diagram of a drive train in connection with an automatic clutch according to the invention.

FIG. 1 shows automatic clutch 1 which may be realized as a dry clutch which is engaged via springs and disengages via an actuating device 4.

The clutch 1 is connected between an engine 2 and a gear box 3, e.g. an automatic and synchronized transmission, in a drive train 2, 1, 3.

Speed sensors 21, 31, 32 determine the engine speed $n_M$, the gear box input speed $n_{GE}$ and the gear box output speed $n_{ab}$ and are disposed at the engine output shaft 23, the gear box input shaft 36, and the gear box output shaft 37.

The electronic control device 6 which consists in known manner, not shown, of an input unit, an output unit, a memory, and one or more microprocessors, receives information via lines 81 from a gear shift selector unit 8, which has a neutral position N, a reverse position R, a forward drive position D, and a position M for manual operation. By means of the keys minus (−) and plus (+), upon each actuation in conjunction with key M, an up shift (+) or down shift (−) can be effected by one speed each.

The electronic control device 6 also receives information concerning the position of the foot brake via line 61, the hand brake via line 62, the kick-down unit via line 63, and the actuation of engine braking via line 64. The position of the clutch 1 is sensed by path sensor 11, and is sent also to the electronic control device 6 as information via line 12. The gear box 3 has a shift valve manifold 35 which receives its shift commands from the electronic control device 6 via line 34, whereby the instantaneous shift engagement is fed back to the electronic control device via line 33. Auxiliary power, e.g. air or hydraulic fluid, is fed to the shift valve manifold 35 via line 30 for the purpose of shifting gears.

Figure 2:
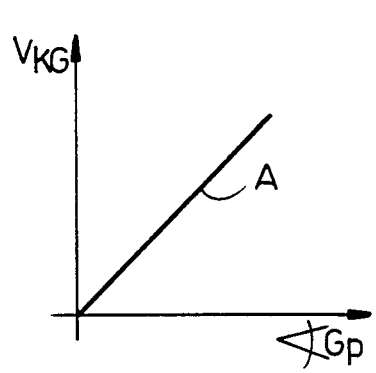
FIG. 2 is a control or characteristic curve for the basic clutching-in speed as a function of gas pedal displacement.

In FIG. 2 the characteristic curve A is shown, which is specific to the engine and is established primarily according to the engine characteristic. Furthermore, the curve is established so that from the angle or the path of the gas pedal displacement, a basic clutch engagement speed $V_{KG}$ of clutch 1 can be derived without having to execute further calculations. In other words the characteristic curve A of FIG. 2 represents the clutch engagement speed $V_{KG}$ which is required for the particular engine as a function of pedal displacement $G_p$.

Figure 3:
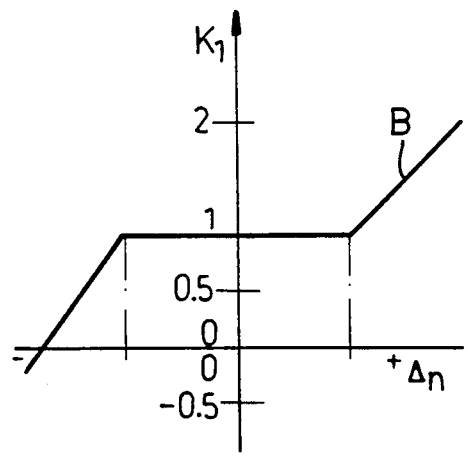
FIG. 3 is a control or characteristic curve for a correction factor as a function of the change in differential speed.

In FIG. 3 a correction factor K1 concerning the change of the differential speed between engine speed $n_M$ and the gear box input speed $N_{GE}$ is inscribed, and a characteristic curve B is determined in such fashion that when the correction is applied to the basic engagement speed $V_{KG}$ the latter is so influenced that a predetermined friction work in the clutch due to various resistances to acceleration such as load, road surface, ride profile, is not exceeded. Further, the correction curve B is such that the engine speed $n^M$ rises slightly less than the input speed to the gear box $n_{GE}$ which becomes effective later, and finally characteristic curve B is shaped so that a slight deviation of the change of the differential speed towards plus and to a greater extent towards minus will lead to a correction factor 1, which when multiplied by the basic clutch-in speed $V_{KG}$ leads to no change in the prevailing clutch-in speed $V_K$.

Figure 4:
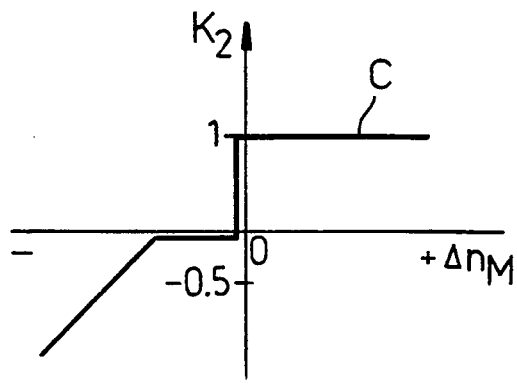
FIG. 4 is a control or characteristic curve for a correction factor as a function of change in engine speed.

A further correction factor K2 in FIG. 4 is shown as a function of the change in engine speed $n_M$. Characteristic curve C is thereby established in such manner that for a positive change in engine speed the correction factor is 1 and when this factor is multiplied by the clutch-in speed $V_{KG}$, it does not cause a change. At constant speed and in a small range of in engine speed, this correction factor is 0, so that in this range the clutch does not engage further. If however the drop in engine speed is greater, then the correction occurs in the direction of reopening of the clutch (negative clutch-in speed).

The degree of decrease in engine speed $n_M$ is influenced by the second correction factor K2, which is of great importance for a good quality of the clutching-in process. Characteristic curve C is also stored in the electronic control device 6.

Figure 5:
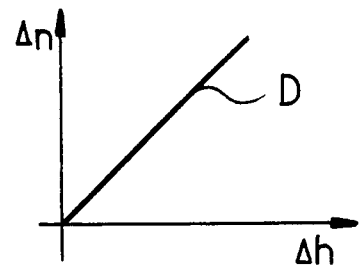
FIG. 5 is a control or characteristic curve for the beginning of the disengagement of the clutch before attainment of synchronous speed as a function of the change in differential speed.
Figure 6:
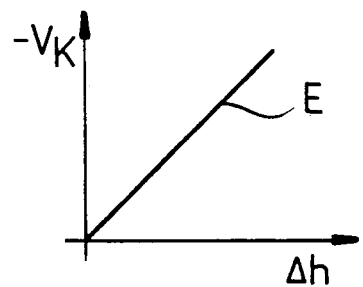
FIG. 6 is a control or characteristic curve for the speed of disengagement of the clutch shortly before attainment of synchronous speed as a function of the change in differential speed.

By means of characteristic curve D of FIG. 5, the initiation of the opening is determined, and by means of characteristic curve E of FIG. 6, the speed of opening (negative clutch-in speed) is determined. Both characteristic curves are also stored in the electronic control device 6.

Figure 7:
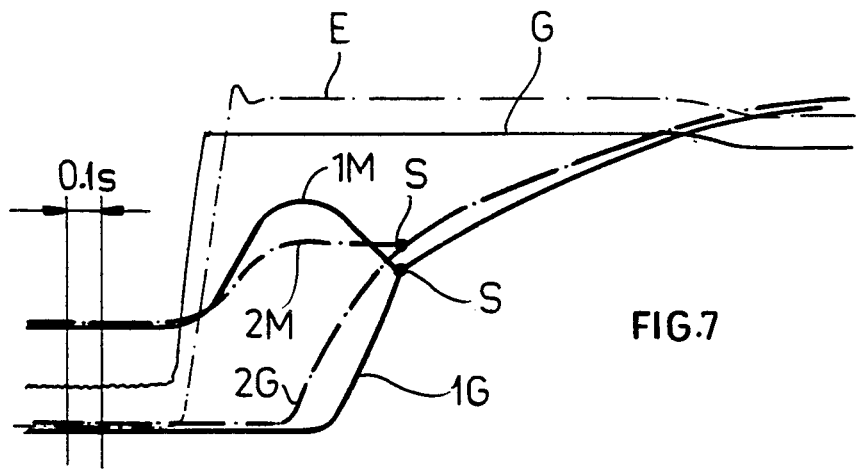
FIG. 7 is a graph with time of the gas pedal position G, the characteristic curve E for the electronic accelerator or E-gas position, the actual value curve 1M of the engine speed in state of the art systems, the actual value curve 2M of the engine speed of the invention, the actual value curve 1G of the transmission in state of the art systems and the actual value curve 2G of the input speed to the transmission according to the invention.

FIG. 7 shows the course of an acceleration process vs. time. Curve G represents the gas pedal position, and curve E the effect of the electronic accelerator 75 or electronic gas (E-gas) position. In the curves 1M, 1G and 2M, 2G the engine speeds and the gear box input speeds are shown, with the state of the art and the subject of the invention in juxtaposition. The state of the art is shown by 1M and 1G.

The apparatus operates as follows:

The engine can only be started with gear shift 8 in position N.

Upon operation of the gear shift 8 e.g. in forward direction D, the first gear is engaged by a command from the electronic control device 6 via line 34 to the shift valve manifold 35 in gear box 3.

With the activation of an engine command parameter, e.g. the actuation of gas pedal 7, the E-gas device 75 is activated in dependence on the actuation angle or path of the pedal which operates the throttle or the fuel injector 22, so that engine output shaft 23 is accelerated.

Simultaneously with the actuation of the gas pedal 7 and as a function of its actuating angle or path, a basic engagement speed $V_{KG}$ for the clutch 1 is generated in the electronic control device 6 and transmitted via line 65 to the control means 5, e.g. a solenoid valve, which supplies an auxiliary force coming via line 51, e.g. air or oil, to the actuator 4, which is unlocked by an actuating rod 41 and a clutch lever 13, to shift the clutch 1 to an open position, so that springs, not shown, in clutch 1 can move it in the direction of engagement.

Thereby a rapid traverse may be provided between the position of full disengagement of the clutch and the point of contact, so that the basic engagement speed $V^{KG}$, which is determined from curve A, FIG. 2, becomes effective only at the point of contact.

During the first phase of the clutching-in process, namely when the change in the speed of the transmission input shaft 36 becomes discernible, the basic coupling engagement speed can be modified by the correction factor K1, which is a function of the change of the differential speed $\Delta n$. As described, and as can be seen in FIG. 3, this correction takes place only when, due to varying resistance to vehicle acceleration, the speeds of the engine output shaft 23 and the gear box input shaft 36 change in an undesired manner. Due to increasing contact between friction surfaces 14, 15 of clutch 1, the input shaft 36 to the gear box 3 is accelerated further.

This taking up of the load by the engine 2 leads to a reduction of the speed increase of the engine shaft 23 and later to a speed reduction—see curve 1M, 2M in FIG. 7.

The gradient of reduction of the engine speed to achieve a further qualitative improvement of the acceleration process can be influenced by the further correction factor K2 according to FIG. 4. The curve C in FIG. 4 is shaped in a manner that upon a positive change of the engine speed, no correction of the engagement speed $V_K$ will take place. At constant engine speed and at a slight decrease of this speed, that is at a negative change of the engine speed, the clutch 1 remains in the prevailing engagement position, and only upon excessive reduction in speed, a negative speed of engagement, that is to say a slight re-disengagement of the clutch, will occur, so that the engine speed will take a course approximately as shown in curve 2M, FIG. 7.

For further qualitative improvement of the clutching-in process, the clutch is opened one more time shortly before attainment of synchronization point S in FIG. 7, in dependence on the change in differential speeds. The moment of opening is determined according to FIG. 5 via the characteristic curve D, and the opening speed according to FIG. 6 via the characteristic curve E, both of which curves are stored in the electronic control device 6.

All changes in the clutch-in speed $V_K$ due to the multiplication of the basic clutch-in speed $V_{KG}$ by correction factor K1 and by correction factor K2 as well as the commands for the reopening of the clutch shortly before synchronization point S and in the opening speeds are transmitted in the same manner as the basic clutch-in speed by the electronic control device 6 via control means 5 to the actuator 4 and from there to clutch 1. In lieu of control means 5 and the actuator 4, a servomotor 9 can be provided which transforms the signal issuing from the electronic control device immediately into a mechanical movement of the clutch lever.

We claim:

1. A control system for control of a clutch of a motor vehicle connected between an engine and a transmission, the control system comprising the combination with said engine, said clutch and said transmission of:
   a clutch actuator connected to said clutch for opening and closing said clutch and imparting a clutch-in movement to said clutch during closing of said clutch;
   a transducing control element connected to said clutch actuator and transforming an electrical signal received by said transducing control element into a control signal for operating said actuator;
   an electronic control device connected to said transducing control element and having means for storing a predetermined relationship between an accelerator-pedal position and a basic clutch-in speed $V_{KG}$ for generating and applying said electrical signal to said transducing control element;
   an accelerator pedal connected to said engine for controlling the acceleration thereof;
   means coupled to said accelerator pedal and operatively connected to said electronic control device for supplying to said electronic control device a signal representing the instantaneous position of said accelerator pedal over an entire duration of a clutch-in process during which said clutch-in movement is applied to said clutch at least during startup of said vehicle, whereby said electrical signal represents a clutch-in speed determined by said position of said gas pedal in accordance with said relationship during said entire duration of the clutch-in process for said startup of said vehicle; and
   means for correcting the clutch-in speed determined by said position of said accelerator pedal and determining said electrical signal in accordance with the speed of said engine during said entire clutch-in process.

2. The control system defined in claim 1 wherein said predetermined relationship is a characteristic curve A relating said basic clutch-in speed $V_{KG}$ to said position of said gas pedal and stored in said electronic control device as derived from a characteristic of said engine.

3. The control system defined in claim 2 wherein said means for correcting said clutch-in speed includes means in said electronic control device for multiplying said basic clutch-in speed $V_{KG}$ by a correction factor K1 determined by a differential speed between an engine speed and an input speed to said transmission to produce a corrected clutch-in speed VK determining the electrical signal applied to said transducing control element.

4. A method of controlling a clutch of a motor vehicle connected between an engine and a transmission by means of a control system comprising the combination with the engine, the clutch and the transmission of:
   a clutch actuator connected to the clutch for opening and closing the clutch and imparting a clutch-in movement to the clutch during closing of the clutch;

a transducing control element connected to the clutch actuator and transforming an electrical signal received by the transducing control element into a control signal for operating the actuator;

an electronic control device connected to the transducing control element and having means for storing a predetermined relationship between an accelerator-pedal position and a basic clutch-in speed $V_{KG}$ for generating and applying the electrical signal to the transducing control element;

an accelerator pedal connected to the engine for controlling the acceleration thereof;

the method comprising the steps of:

supplying to the electronic control device a signal representing the instantaneous position of the accelerator pedal over an entire duration of a clutch-in process during which the clutch-in movement is applied to the clutch at least during startup of the vehicle, whereby the electrical signal represents a clutch-in speed determined by the position of the gas pedal in accordance with the relationship during the entire duration of the clutch-in process for the startup of the vehicle; and correcting the clutch-in speed determined by the position of the accelerator pedal and determining the electrical signal in accordance with the speed of the engine during the entire clutch-in process.

5. The control method defined in claim 4 wherein the predetermined relationship is a characteristic curve A relating the basic clutch-in speed $V_{KG}$ to the position of the gas pedal and stored in the electronic control device as derived from a characteristic of the engine.

6. The control method defined in claim 5 wherein clutch-in speed is corrected by:

multiplying the basic clutch-in speed $V_{KG}$ by a correction factor K1 determined by a differential speed between an engine speed and an input speed to the transmission to produce a corrected clutch-in speed VK determining the electrical signal applied to the transducing control element.

7. The control method defined in claim 6, further comprising the step of multiplying the clutch-in speed VK by a second correction factor K2 derived from a change in the engine speed when the engine attains a maximum engine speed during the clutch-in process.

8. The control method defined in claim 6, further comprising the step of storing the correction factor in the electronic control device as a characteristic curve so shaped that, upon multiplication of the basic clutch-in speed VKG by the correction factor, a predetermined friction in the clutch is not exceeded.

9. The control method defined in claim 8 wherein the correction in the electronic control device is so effected that, upon a slight deviation of the differential speed, correction of the basic clutch-in speed VKG is omitted and the basic clutch-in speed for the clutch is effective up to a maximum speed of the engine during the clutch-in process.

10. The control method defined in claim 7, further comprising the step of storing the second correction factor K2 in the electronic control device as a characteristic curve C so configured that, during a positive change of the engine speed, there is no change in the corrected clutch-in speed VK, during constant or slightly decreasing engine speed the clutch remains in a prior engagement position, and during a strong decrease in engine speed a negative clutch-in speed is effective to move the clutch toward an open position.

11. The control method defined in claim 10, further comprising the steps of storing in the electronic control device characteristic curves for the instant of clutch opening and for the speed of clutch opening, the latter curve being a function of the differential speed and of change in the differential speed and the former curve being a function of the change in the differential speed and the negative clutch-in speed.

* * * * *